United States Patent [19]

Bennecke et al.

[11] 4,230,577
[45] Oct. 28, 1980

[54] TANK FOR CLEANING AND CHEMICAL TREATMENT OF BOILER FEEDWATER

[76] Inventors: Earl J. Bennecke; Mark R. Bennecke, both of 8249 S. Lockwood, Burbank, Ill. 60459

[21] Appl. No.: 36,077

[22] Filed: May 4, 1979

[51] Int. Cl.³ .............................................. B01D 35/00
[52] U.S. Cl. ..................................... 210/85; 210/109; 210/176; 210/198 R; 210/220; 210/332; 210/336; 210/458; 210/519; 210/525; 210/532 R; 210/533; 134/109; 122/401
[58] Field of Search ..................... 210/59, 71, 85, 109, 210/176, 177, 183, 198 R, 199, 220, 302, 332, 336, 338, 342, 458, 513, 519, 525, 532 A, 532 S–539; 134/105, 109; 122/401

[56] References Cited
U.S. PATENT DOCUMENTS 2,057,883  10/1936  Dehn ................................. 210/539
4,144,172   3/1979  Bennecke et al. ................ 210/525

*Primary Examiner*—Ferris H. Lander
*Attorney, Agent, or Firm*—Rummler & Snow

[57] ABSTRACT

A boiler feedwater conditioning tank for removing mud, iron and any other settleable solids from boiler feedwater and adding soluble chemicals to the same, wherein the feedwater is mixed and heated by passing the mixture down and around and up into and through a system of concentric open-ended standpipes erected within the tank. The outlet for clean feedwater lies at the top of the tank inside the upper end of the inner standpipe, and the inlets for the same lie distributively around the outside of the outer standpipe at the bottom thereof. The input port for chemicals lies in the tank side walls and steam heating coils lie between the outer standpipe and the wall of the tank in the path of convective flow of feedwater up between the same.

3 Claims, 1 Drawing Figure

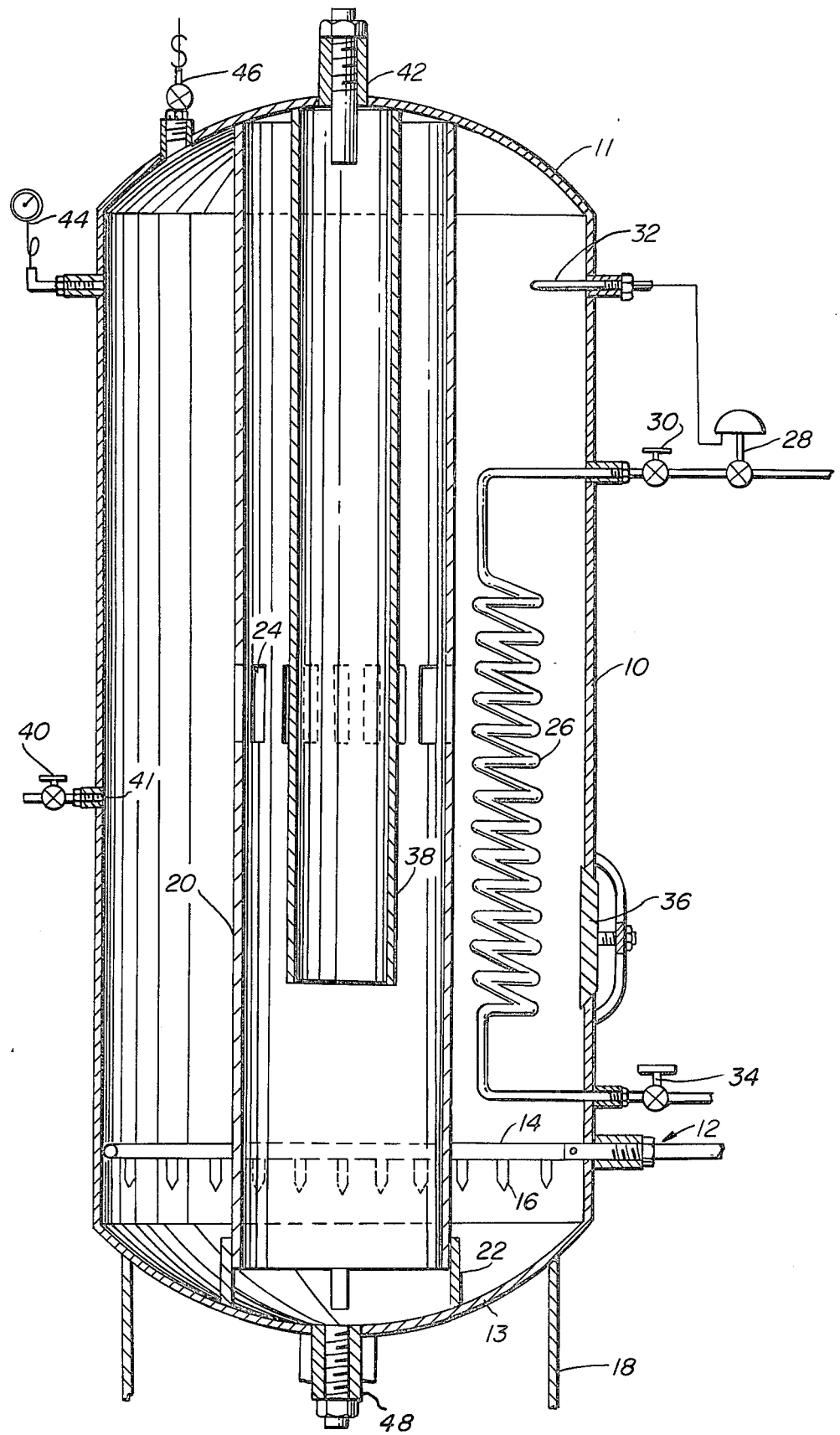

TANK FOR CLEANING AND CHEMICAL TREATMENT OF BOILER FEEDWATER

BACKGROUND OF THE INVENTION

Mud, iron or other mineral settleable solids in boiler feedwater cause a multitude of problems within boilers, connecting pipes and control valves. Such solids precipitate a scaly deposit on the interior surface of boiler tubes reducing heat transfer coefficients of the tubes for absorbing heat from furnace gases and producing steam which increases the amount of fuel burned to obtain a desired boiler power output. In order to offset this decrease in boiler efficiency, frequent teardowns must be made during which the tubes of the boiler are reamed of this scale until the bare metal is exposed. Soluble chemicals are introduced into the feedwater to inhibit precipitation of these solids and to neutralize the solution adding to the cost of the operation and cutting down on the life of the boiler. The settleable solids system is similar to that of my industrial cleansing apparatus covered by U.S. Pat. No. 4,144,172.

In boilers with 20% to 100% make-up water, chemicals are usually premixed in a separate vessel and pumped into the condensate return tank. The premixing is not always complete in the process and grit therefrom can cause undue wear in the feedwater pump and clog up the piping in general. Also, cold feedwater entering a hot boiler thermally shocks the hot feedwater in the boiler and reduces solubility thereby adding to the scaly deposit problem.

There is an established need for a solids separator which uniformly preheats and chemically treats boiler feedwater as it cleans the same, requiring only the occasional opening of a valve at the bottom of a settling tank for flushing out the solids therein.

SUMMARY OF THE INVENTION

The gist of this invention lies in a conditioning tank which preheats and chemically treats boiler feedwater while it cleans the same. Convective flow patterns for the heated dirty feedwater reverse in direction through the concentric standpipes within the tank uniformly mixing the chemicals and heating the water while separating the insoluble solids from the same. The inner standpipe opens at its lower end above the bottom of the outer pipe in the tank. The outer pipe has weir slots in its side wall above the bottom of the inner pipe. Said outer pipe opens its lower end spaced above the bottom of said tank to the inflow of dirty feedwater into the same. The outlet for clean, heated and chemically-treated water is out the top of the inner pipe through the top wall of the tank. The inputs for soluble chemicals and heat are outside the outer pipe in the tank inside the outer side wall thereof. A sludge discharge outlet in the bottom wall of the tank drains the same.

DESCRIPTION OF THE DRAWING

FIG. 1 shows a vertical cross-sectional view of the separating and chemical treatment tank of this invention.

THE PREFERRED EMBODIMENT

Reference to FIG. 1 shows a standing cylindrical tank 10 having a top 11 and bottom 13 and a dirty feedwater inlet 12 in fluid communication with a source (not shown) through the bottom 13 of the same. A circular feedwater distribution tube 14 which is in fluid communication with the inlet 12 is mounted inside of the side wall of the tank in spaced relation above the bottom 13. A plurality of nozzles 16 are equally-spaced around the circumference of the distribution tube 14 in fluid communication therewith, each nozzle being directed to discharge feedwater downwardly towards the bottom 13 of tank 10. A ring stand 18 is mounted under the bottom 13 for support of the tank 10.

An outer cylindrical standpipe 20, having its top end secured to the top 11 of tank 10, is mounted in concentric relation to the side wall of the tank 10. A plurality of feet 22 depend from the lower end of pipe 20 to the bottom 13 of tank 10 for supporting the lower open end of the pipe 20 in spaced relation to the bottom of said tank 10. A plurality of weir slots 24 which are equally-spaced around the circumference of pipe 20 cut through the wall of the same halfway up the length of the same for convective flow of the feedwater from outside of outer pipe 20 to the interior thereof.

A steam heating coil 26, which is mounted between the outside of pipe 20 and the inside wall of tank 10, extends upwardly from above the feedwater distribution tube 14 to above the level of the weir slots 24 in the pipe 20. A steam flow control valve 28, which is in fluid communication with a steam source (not shown) supplies steam through a shutoff valve 30 in the side wall of tank 10 to the upper or inlet end of the steam coil 26. A temperature sensing probe 32 extends through the side wall of tank 10 adjacent its top 11 and extends into the feedwater therein. Probe 32 is in operational connection with the steam control valve 28 for automatic feedback control of the same. A shutoff valve 34, which is in fluid communication with a condensate sink (not shown), controls the flow of condensate from out the steam coil 26.

An inner cylindrical standpipe 38 depends from the top 11 of tank 10 within and in concentric relation with pipe 20. The lower open end of pipe 20 depends downwardly from the top of said tank 10 to about midway between the bottom end of outer pipe 20 and the weir slots 24.

A conduit and flow control valve 40, which is in fluid communication with a chemical source (not shown) and with the interior of the tank 10 through a port 41 in the side wall thereof, provides chemical material for the treatment of the feedwater in the tank 10. A pipe connector 42, which is in fluid communication at one end with a boiler (not shown) and at its other end with the top end of inner pipe 38 in the top of tank 10, provides an outlet for the fully conditioned feedwater from the tank 10. A pressure gage 44, which is in fluid communication with the interior of the tank 10 outside of pipe 20, provides for the readout of the same. A pressure relief valve 46, likewise in fluid communication with tank 10 outside of pipe 20, provides overload protection. A manhole cover 36 in the side wall of the tank 10 provides for service and inspection of the interior of the same. A suitable drain plug 48 at the bottom of the tank 10 provides for the removal of settled solids or sludge.

A typical tank 10 has an outer standpipe 20 with a hydraulic diameter about 40% of the hydraulic diameter of the tank 10 and about twice that of the inner standpipe 38, which outer pipe 20 has its open bottom about one-fifth its diameter up from the bottom of tank 10, and which inner pipe 38 has its open bottom about four of its diameters up from the bottom of the tank 10, the length of the weir slots 24 ranging from one to two times the inner pipe diameter 38 up three to four inner pipe diameters from the bottom of the inner pipe 38.

In operation, dirty feedwater is fed into the conditioning tank 10 by means of inlet 12 which is in fluid communication with feedwater distribution tube 14 inside the tank 10. The nozzles 16 in the distribution tube 14 uniformly introduce the dirty feedwater into the bottom of tank 10 in a downwardly direction from whence a portion of the feedwater flows radially inwardly along the bottom of the same into the open end at the bottom of the outer pipe 20 and up through the inside thereof. The remaining portion of the inflowing feedwater flows upwardly outside of outer pipe 20, through steam heating coil 26, and past chemical inlet port 41 and back through weir slots 24 in the side wall of the same into the outer pipe 20. The feedwater introduced into the outer pipe 20 through the weir slots 24 flows downwardly therein to head-on meet the portion of said feedwater coming up from the open end at the bottom thereof where the two portions merge and flow up into the open lower end of the inner pipe 38. The merged portions of this clean, heated and chemically-treated feedwater then flow up the inside of the inner pipe 38 through the outlet 42 in the top of tank 10 and on to the boilers.

Although but one specific embodiment of this invention is herein shown and described, it will be understood that details of the construction shown may be altered or omitted without departing from the spirit of the invention as defined by the following claims.

We claim:

1. An apparatus for heating, chemical-mixing and cleaning boiler feedwater comprising:
   (a) an upstanding tank having closed top and bottom with an outlet centrally located in the top thereof;
   (b) an outer standpipe having an open bottom within said tank depending from the top thereof, said outer pipe depending a greater length from the top of the tank and having weir slots in its wall midway up the length of the tank;
   (c) an inner open-bottom standpipe substantially concentric within said outer standpipe depending a lesser length from the top of the tank and opening at its bottom below the weir slots in the outer standpipe;
   (d) a distributive inlet means within the tank adjacent to the bottom of the same above the bottom of said outer standpipe below the weir slots therein wherein the distributive inlet means comprises a circumferential tube adjacent to the inside of the wall of the tank having a plurality of spaced nozzles mounted therearound in fluid communication therewith and directed toward the bottom of the tank; and
   (e) chemical input and heating means between the outer standpipe and the wall of the tank below the level of the weir slots with drain means centrally located in the bottom of the same.

2. A tank as in claim 1 wherein the outer standpipe comprises a hydraulic diameter about forty percent of the tank and twice that of the inner standpipe, having its open-bottom about one-fifth its diameter up from the bottom of said tank, and the open-bottom of the inner pipe about four of its diameters up from the bottom of the same, the length of the weir slots ranging from one to two times the inner pipe diameter up three to four inner pipe diameters from the bottom of the inner pipe.

3. An apparatus for heating, chemical mixing and cleaning boiler feedwater of solid matter comprising:
   (a) a standing tank having closed top and bottom with distributive inlet means spaced above the bottom and adjacent to the wall of the tank for distribution of dirty feedwater therein, and and outlet from said tank in the top of the same;
   (b) an outer standpipe within the tank depending from the top thereof having a weir means in its wall midway up between the top and bottom of the tank, and an open-bottom spaced above the bottom of said tank between the distributive inlet means to the tank and the weir means in the wall of said outer standpipe;
   (c) an inner standpipe within the outer standpipe depending from the top of the tank in fluid communication at its top end with the outlet from the tank having an open-bottom spaced above the bottom of said tank between the weir means in the wall of said outer standpipe and the open-bottom of the same;
   (d) a heating means in the lower portion of the tank between the outer standpipe and the inner side wall of the tank above the bottom of said outer pipe;
   (e) a chemical input means in fluid communication with said tank outside of said outer standpipe above the bottom of said outer pipe and below the weir means in the wall thereof; and
   (f) sensing means in the upper portion of said tank between the outer standpipe and the inner side walls of the tank for regulating said heating means and valve means in the bottom of said tank for the removal of solids therefrom.

* * * * *